(12) United States Patent
Miyajima

(10) Patent No.: US 8,682,531 B2
(45) Date of Patent: Mar. 25, 2014

(54) IMAGE PROCESSING SYSTEM AND VEHICLE CONTROL SYSTEM

(75) Inventor: Takayuki Miyajima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 106 days.

(21) Appl. No.: 13/013,242

(22) Filed: Jan. 25, 2011

(65) Prior Publication Data

US 2011/0246027 A1    Oct. 6, 2011

(30) Foreign Application Priority Data

Mar. 31, 2010    (JP) .................................. 2010-084692

(51) Int. Cl.
*B62D 12/00*    (2006.01)
*G01C 22/00*    (2006.01)
*G05D 1/00*    (2006.01)

(52) U.S. Cl.
USPC ................................. 701/41; 701/28; 701/523

(58) Field of Classification Search
USPC ................................. 701/523, 41, 28; 382/190
See application file for complete search history.

(56) References Cited

U.S. PATENT DOCUMENTS

| | | | | |
|---|---|---|---|---|
| 6,169,940 | B1 * | 1/2001 | Jitsukata et al. | 701/23 |
| 8,175,806 | B2 * | 5/2012 | Kodaira et al. | 701/523 |
| 2003/0074130 | A1 | 4/2003 | Negishi et al. | |
| 2006/0002590 | A1 * | 1/2006 | Borak | 382/104 |
| 2008/0240573 | A1 | 10/2008 | Nakamura et al. | |
| 2010/0121569 | A1 * | 5/2010 | Nakamura et al. | 701/208 |
| 2011/0044543 | A1 * | 2/2011 | Nakamura et al. | 382/190 |
| 2011/0313653 | A1 * | 12/2011 | Lindner | 701/201 |

FOREIGN PATENT DOCUMENTS

| | | |
|---|---|---|
| JP | A-2007-108043 | 4/2007 |
| JP | A-2008-298699 | 12/2008 |
| WO | WO 2009/007904 A1 | 1/2009 |

OTHER PUBLICATIONS

Oct. 8, 2013 European Search Report issued in EP 11 15 2911.

* cited by examiner

*Primary Examiner* — John Q Nguyen
*Assistant Examiner* — Brian J Broadhead
(74) *Attorney, Agent, or Firm* — Oliff PLC

(57) ABSTRACT

An image processing system inputs a captured image of a scene viewed from a vehicle in a predetermined road section and an image-capturing position at which the image is captured. The system uses a given position in the predetermined road section as a specific position, and sets a target vehicle movement amount at the specific position, for passing through the predetermined road section. The system generates reference image data from the captured image obtained at the specific position. The system generates reference data that is used when scenic image recognition is performed, by associating the reference image data with the specific position and the target vehicle movement amount at the specific position, and generates a reference data database that is a database of the reference data.

5 Claims, 7 Drawing Sheets

FIG. 5A
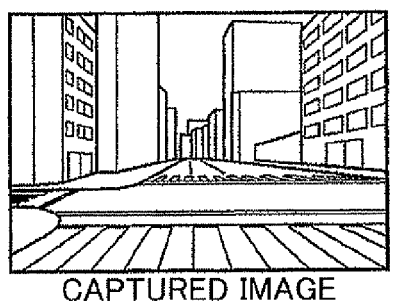
CAPTURED IMAGE
FIG. 5B
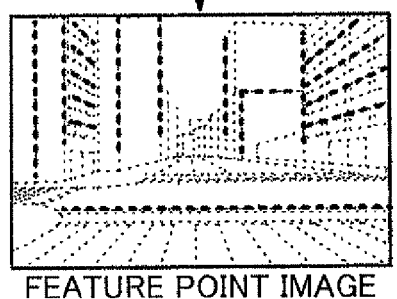
FEATURE POINT IMAGE
FIG. 5C
| 4 | 3 | 4 | 2 | 1 | 2 | 2 | 4 | 2 | 2 |
|---|---|---|---|---|---|---|---|---|---|
| 4 | 3 | 4 | 2 | 1 | 2 | 2 | 4 | 2 | 2 |
| 4 | 3 | 4 | 2 | 1 | 2 | 4 | 4 | 2 | 2 |
| 4 | 3 | 4 | 2 | 1 | 2 | 4 | 4 | 2 | 2 |
| 3 | 1 | 1 | 1 | 1 | 1 | 1 | 1 | 1 | 1 |
| 1 | 2 | 2 | 2 | 2 | 2 | 2 | 2 | 2 | 2 |
| 1 | 1 | 1 | 1 | 1 | 1 | 1 | 1 | 1 | 1 |
IMPORTANCE DEGREE LAYER
FIG. 5D
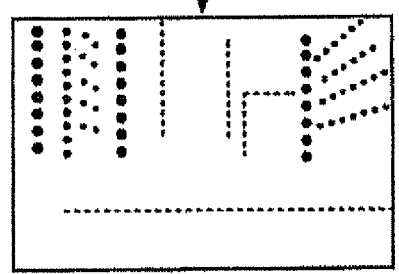
FEATURE POINT IMAGE IN WHICH WEIGHT COEFFICIENTS ARE ASSIGNED
FIG. 5E
| -1 |   | -1 |   | -1 |   | -1 |
|----|---|----|---|----|---|----|
|  1 |   |  1 |   |  1 |   |  1 |
| -3 |   | -3 |   | -3 |   | -3 |
ADJUSTMENT COEFFICIENT LAYER
FIG. 5F
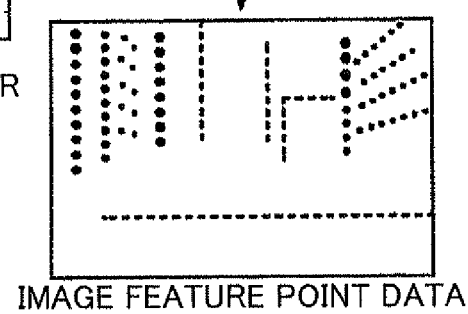
IMAGE FEATURE POINT DATA

IMAGE PROCESSING SYSTEM AND VEHICLE CONTROL SYSTEM

INCORPORATION BY REFERENCE

The disclosure of Japanese Patent Application No. 2010-084692 filed on Mar. 31, 2010 including the specification, drawings and abstract is incorporated herein by reference in its entirety.

BACKGROUND OF THE INVENTION

1. Field of the Invention

The invention relates to an image processing system, and more particularly to a system suitable for generating reference data suitable for scenic image recognition performed by a navigation apparatus, and a vehicle control system that uses the system.

2. Description of the Related Art

In technical field of car navigation, a method in which information obtained from sensors such as a gyro sensor and a geomagnetic sensor is used (an autonomous navigation method), a method in which signals from GPS satellites are used, or the combination of the autonomous navigation method and the method in which signals from GPS satellites are used has been employed as a method of calculating the current position of a vehicle. Further, for example, a position measurement apparatus described in Japanese Patent Application Publication No. 2007-108043 (JP-A-2007-108043) is known as a position measurement apparatus configured to accurately calculate the current position (refer to the paragraphs 0009 to 0013, and FIG. 1). In the position measurement apparatus, first, a tentative current position is obtained using the signals from navigation satellites, and the like. Then, the coordinates of a feature point (a vehicle coordinate system feature point) of a road marking in a coordinate system (a vehicle coordinate system) with respect to the tentative current position are calculated using the captured image of a scene ahead of the vehicle. Then, the current position of the vehicle is calculated using the calculated vehicle coordinate system feature point and the stored coordinates of the feature point of the road marking (i.e., the coordinates shown in the world coordinate system). In the position measurement apparatus, it is possible to accurately calculate the current position, even when the position measured using the signals transmitted from the navigation satellites and/or signals transmitted from various sensors includes an error.

In the technical field of car navigation, for example, Japanese Patent Application Publication No. 2008-298699 (JP-A-2008-298699) (refer to paragraphs 0007 to 0023 and FIG. 9) proposes a technology in which, on the basis of object information including information on the position and the shape of an object whose image is captured by a camera, measurement point information is obtained. The measurement point information includes shape information and position information on a measurement point that is set in advance in accordance with the type of the object. In the technology, image recognition of the measurement point in the object included in image information is performed based on the shape information included in the measurement point information. Then, the vehicle position information is corrected based on the result of the image recognition, and the position information on the measurement point. Japanese Patent Application Publication No. 2008-298699 (JP-A-2008-298699) also proposes a technology in which the travel of the vehicle is controlled based on the corrected vehicle position information. According to the technology, it is possible to correct the vehicle position information using the result of the image recognition of the object, and to control the travel of the vehicle based on the corrected vehicle position information, when the vehicle is traveling on an expressway where there are not many objects to be recognized, such as an intersection symbol.

SUMMARY OF THE INVENTION

In the position measurement apparatus described in Japanese Patent Application Publication No, 2007-108043 (JP-A-2007-108043), the space coordinates of the feature point of the road marking on a road are obtained using a stereo image, and the latitude and the longitude of the road marking having the feature point are obtained from the database of road marking information. Thus, the current position of the vehicle is calculated using the coordinates obtained using the latitude and the longitude of the road marking. Therefore, the position measurement apparatus cannot be used in an area where there is no road marking. Also, in the technology described in Japanese Patent Application Publication No. 2008-298699 (JP-A-2008-298699), image recognition is performed on portions which are provided at a certain interval, and at which a solid line road marking branches from, or joins to a dashed line road marking, in a connection portion of an expressway, at which a main road is connected to another road. Thus, it is difficult to apply the technology to an ordinary road other than an expressway.

In view of the above-described situation, it is desired to develop a technology that makes it possible to more accurately detect the vehicle position using image recognition when the vehicle is traveling on various vehicle traveling roads including an expressway and an ordinary road, and further, it is desired to develop a vehicle control system that uses the more accurate vehicle position detection technology.

A first aspect of the invention relates to an image processing system that includes a data input unit to which a captured image obtained by capturing an image of a scene viewed from a vehicle in a predetermined road section, and an image-capturing position at which the image is captured to obtain the captured image are input; a target movement amount setting unit that uses a given position in the predetermined road section as a specific position, and sets a target vehicle movement amount at the specific position, for passing through the predetermined road section; a reference image data generation unit that generates reference image data from the captured image obtained at the specific position; and a reference data database creation unit that generates reference data that is used when scenic image recognition is performed, by associating the reference image data with the specific position and the target vehicle movement amount at the specific position, and generates a reference data database that is a database of the reference data.

For example, when the vehicle travels in the predetermined road section such as a curved road or a slope road, it is necessary to change the movement amount of the vehicle in order that the vehicle passes through the road section. According to the first aspect of the invention, the reference image data is created from the captured image at the specific position in the predetermined road section. Further, the reference data used for scenic image recognition processing is generated by associating the reference image data with the specific position and the target vehicle movement amount at the specific position, which is set for passing through the predetermined road section. Then, the database of the reference data is generated. When matching is sequentially repeated between the reference data and the captured image that is obtained while the vehicle is actually traveling, and the reference data associated with the specific position and the target vehicle movement amount matches the captured image, it is possible to recognize the appropriate target vehicle movement amount of the vehicle at the specific position. Also, because the vehicle position is determined based on the image recognition of the captured image of an ordinary scene, the determination of the vehicle position is not influenced by road conditions.

A second aspect of the invention relates to a vehicle control system that includes the reference data database created by the image processing system according to the first aspect; a captured image processing unit to which a captured image is input, and which outputs data for matching based on the captured image, wherein the captured image is obtained by capturing an image of a scene viewed from a camera provided in a vehicle; a vehicle position estimation unit that estimates a position of the vehicle; a reference data extraction unit that extracts reference data from the reference data database, based on the estimated position of the vehicle; a matching performing unit that performs matching between the extracted reference data and the data for matching; a target vehicle movement amount retrieval unit that retrieves a target vehicle movement amount associated with the reference data that matches the data for matching; and a vehicle movement amount adjustment unit that adjusts a movement amount of the vehicle based on the retrieved target vehicle movement amount.

According to the second aspect of the invention, it is possible to more accurately determine the vehicle position by performing the scenic image recognition, regardless of road conditions. In addition, because the appropriate target vehicle movement amount at the determined vehicle position is associated with the reference data, it is possible to retrieve the target vehicle movement amount, and to appropriately adjust the movement amount of the vehicle based on the retrieved target vehicle movement amount.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 5A to 5F are schematic diagrams schematically showing adjustment of weight coefficients using adjustment coefficients;

DETAILED DESCRIPTION OF EMBODIMENTS

Figure 1:
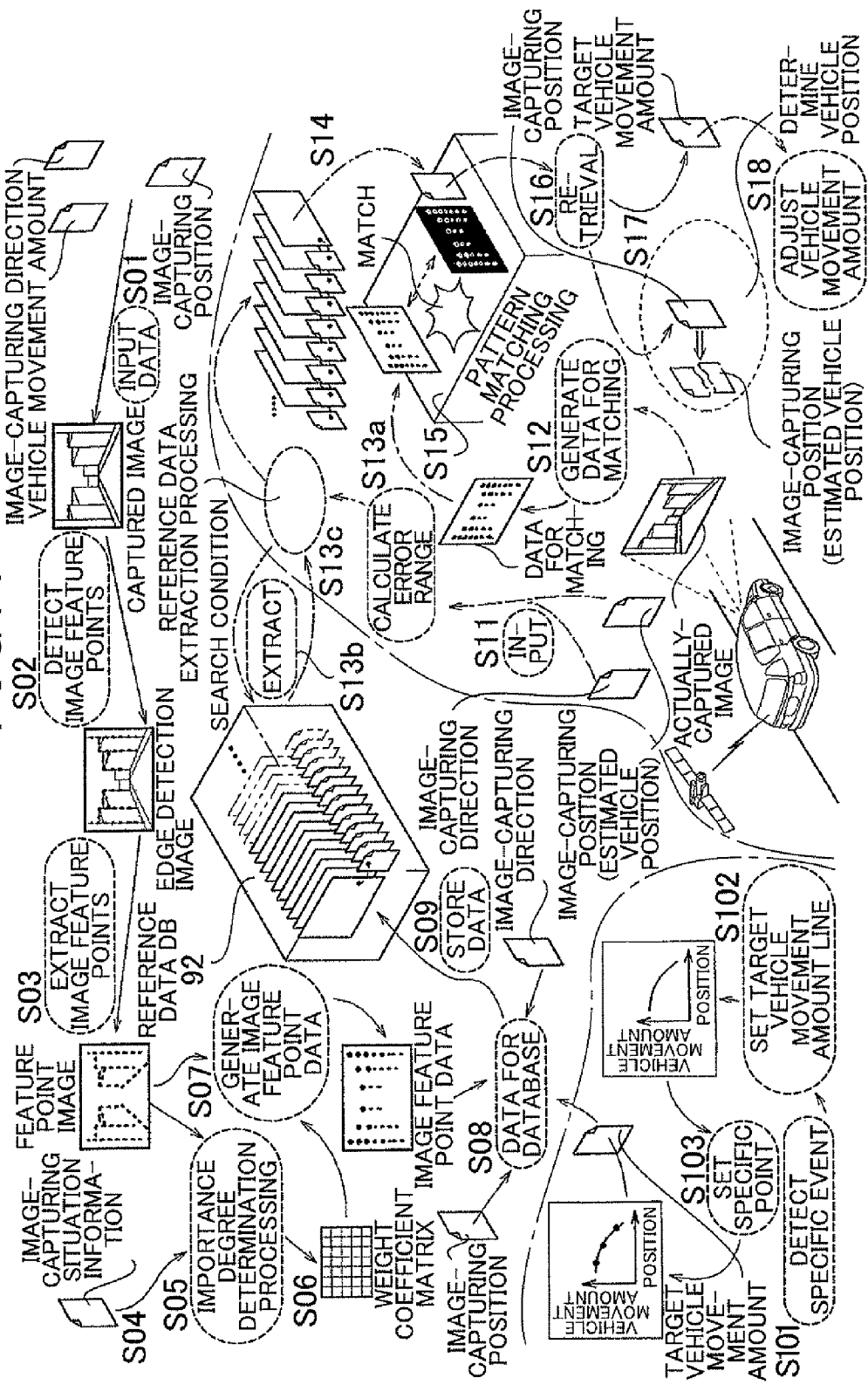
FIG. 1 is a schematic diagram used for explaining the creation of reference data by an image processing system according to an embodiment of the invention, and the basic concept of a technology in which a vehicle position is determined and a target vehicle movement amount is adjusted through matching processing using the reference data.

Hereinafter, an embodiment of the invention will be described in detail with reference to the drawings. FIG. 1 schematically shows the creation of reference data from a scenic image by an image processing system according to the embodiment of the invention. The scenic image is captured by a vehicle-mounted camera. FIG. 1 also schematically shows the basic concept of a technology in which a vehicle position is determined and a target vehicle movement amount is adjusted through matching processing using the reference data.

First, a procedure for creating a reference data database (hereinafter, simply referred to as "reference data DB") 92 will be described. As shown in FIG. 1, first, a captured image obtained by capturing an image of a scene viewed from a vehicle during travel, and image-capturing attribute information are input (step 01). The image-capturing attribute information includes an image-capturing position of the captured image and an image-capturing direction of the captured image at the time of image capturing. The term "an image-capturing position of the captured image" signifies a position at which the image is captured to obtain the captured image. The term "an image-capturing direction of the captured image" signifies a direction in which the image is captured to obtain the captured image. Then, feature point detection processing for detecting image feature points, for example, edge detection processing is performed on the input captured image (step 02). A portion, at which edge points corresponding to one or more pixels constitute one line segment, for example, an outline, is referred to as "a line segment edge". An intersection point, at which a plurality of the line segment edges intersect with each other, is referred to as "a corner". The edge points, which constitute the line segment edge, are referred to as "line segment edge points". Among the line segment edge points, the edge point corresponding to the corner is referred to as "a corner edge point". The line segment edge points and the corner edge point are examples of the image feature point. The line segment edge points including the corner edge point are extracted, as the image feature points, from an edge detection image obtained through the edge detection processing (step 03).

In processing different from the processing from step 01 to 03 (i.e., processing executed in parallel with the processing from step 01 to 03), image-capturing situation information is obtained (step 04). The image-capturing situation information indicates the possibility that a specific subject is included in the captured image. As described in detail later, the image-capturing situation information is used for the image feature points distributed in regions of the captured image, in order to make the importance degree of the image feature point in the region where the specific subject is located different from the importance degree of the image feature point in the other region. It is possible to create the reliable reference data DB 92 eventually, by decreasing the importance degree of the image feature point that is not suitable for the scenic image recognition, and/or increasing the importance degree of the image feature point that is important for the scenic image recognition, using the image-capturing situation information.

The importance degree of each image feature point is determined based on the image-capturing situation information (step 05). Then, a weight coefficient matrix is generated (step 06). The weight coefficient matrix stipulates the assignment of the weight coefficients to the image feature points in accordance with the importance degrees of the image feature points. The subject to be included in the image-capturing situation information may be detected from the captured image through the image recognition processing, or may be detected by processing sensor signals from various vehicle-mounted sensors (a distance sensor, an obstacle detection sensor, and the like). Alternatively, the subject to be included in the image-capturing situation information may be detected by processing signals from outside, which are obtained from, for example, the Vehicle Information and Communication System (VICS) (Registered Trademark in Japan).

Subsequently, image feature point data is generated for each captured image, by performing processing on the image feature points based on the weight coefficients (step 07). During the process of generating the image feature point data, selection processing is performed. That is, the image feature points with the weight coefficients equal to or lower than a first threshold value are discarded, and/or the image feature points are discarded except the image feature points with the weight coefficients equal to or higher than a second threshold value and the image feature points around the image feature points with the weight coefficients equal to or higher than the second threshold value. When pattern matching is employed for the scenic image recognition, the image feature point data generated in this step is used as the pattern. Therefore, in order to achieve the high-speed performance and high accuracy of the matching, it is important that the image feature point data should include only the image feature points useful for the pattern matching for the scenic image. The generated image feature point data becomes the reference image data for the scenic image pattern matching. The reference image data (the image feature point data) is associated with the image-capturing position of the corresponding captured image, and/or the image-capturing direction of the corresponding captured image. Thus, the data for a database that is searchable using the image-capturing position and/or the image-capturing direction as a search condition, that is, the reference data is generated (step 08). That is, the reference image data is stored in the reference data DB 92 as a part of the reference data used for the scenic image recognition, for example, as the pattern for the pattern matching (step 09).

Next, the processing of associating the reference image data with a target vehicle movement amount (a vehicle speed, a steering angle, or the like) will be described. In the following description of the embodiment, a curved road is employed as a predetermined road section. A given position in the predetermined road section is referred to as "a specific position". The specific position may be interpreted as the vehicle position. An event, such as deceleration, acceleration, or a steering behavior, which is caused in the vehicle in the predetermined road section in order to pass through the predetermined road section, is referred to as "a specific event". The target vehicle movement amount at each specific position is set in association with the specific event. During the processing of creating the reference data for the database in step 08, the target vehicle movement amount described below is also associated with the image feature point data corresponding to the captured scenic image that is captured while a vehicle movement amount changes during the specific event occurring in the vehicle, or during the preparation for the specific event. When the specific event occurring in the vehicle, such as cornering, is recognized (step 101), a target vehicle movement amount line, which is determined in advance for the recognized specific event, is set. The target vehicle movement amount line defines a relation between the specific position and the target vehicle movement amount. In other words, a group of specific points determined based on the specific positions and the target vehicle movement amounts, or a line that approximately connects the specific points is set (step 102). The target vehicle movement amount line is substantially a function curve showing the relation between the vehicle position and the target vehicle movement amount. Accordingly, by specifying one or a plurality of intended specific points on the target vehicle movement amount line indicated by the function curve, the specific position(s) that is(are) the vehicle position(s), and the target vehicle movement amount(s) are obtained (step 103). The specific positions(s) and the target vehicle movement amount(s) are determined based on the specific point(s). In step 08, the reference image data, which is generated from the captured image at the image-capturing position corresponding to the specific position obtained in step 103, is associated with the target vehicle movement amount obtained in step 103. Thus, the reference image data becomes the reference data associated with the image-capturing position, that is, the specific position and the target vehicle movement amount. The reference data is stored in the reference data DB 92 (step 09). In the procedure that has been described, the reference image data generated from the captured image whose image-capturing position matches the specific position is extracted from the reference image data generated from the captured images obtained by capturing scenic images at intervals of a predetermined distance or intervals of a predetermined time, and the reference data is created by associating the extracted reference image data with the specific position and the target vehicle movement amount. Instead of the procedure, a procedure, in which the specific position is determined in advance, and the reference data is created by associating the reference image data generated from the scenic image captured at the specific position, with the specific position and the target vehicle movement amount, may be employed.

Further, a procedure for determining the position of the vehicle (vehicle position) while the vehicle is actually traveling using the reference data DB 92 created by the above-described procedure will be described. As shown in FIG. 1, first, an actually-captured image, which is obtained by capturing an image of a scene using the vehicle-mounted camera, and the image-capturing position and the image-capturing direction of the actually-captured image, which are used to extract the reference data from the reference data DB 92, are input (step 11). The image-capturing position input in this step is an estimated vehicle position that is estimated using, for example, a GPS measurement unit. The data for matching, which is the image feature point data, is generated from the input captured image, through the step 02 to the step 07 described above (step 12). Simultaneously, an error range of the estimated vehicle position based on a measurement error of the estimated vehicle position is calculated using the input image-capturing position and the input image-capturing direction (step 13*a*). A set of the reference data associated with the image-capturing positions (the specific positions) in the error range is extracted from the reference data DB 92 as a matching candidate reference dataset, using the error range as a search condition (step 13*b*). Then, the matching candidate reference dataset is output (step 13*c*).

Each reference data included in the extracted matching candidate reference dataset is set as the pattern, and the processing of pattern matching between each pattern and the data for matching generated from the actually-captured image is performed as the scenic image recognition (step 14). When the reference data, which is set as the pattern, matches the data for matching (step 15), the image-capturing position associated with the reference data that matches the data for matching is retrieved. When the reference data is associated with the target vehicle movement amount, the target vehicle movement amount is also retrieved (step 16). The retrieved image-capturing position is determined to be a formal vehicle position, instead of the estimated vehicle position (step 17). Further, when the target vehicle movement amount is retrieved, a vehicle control is performed to adjust the vehicle movement amount to the target vehicle movement amount (step 18).

Figure 2:
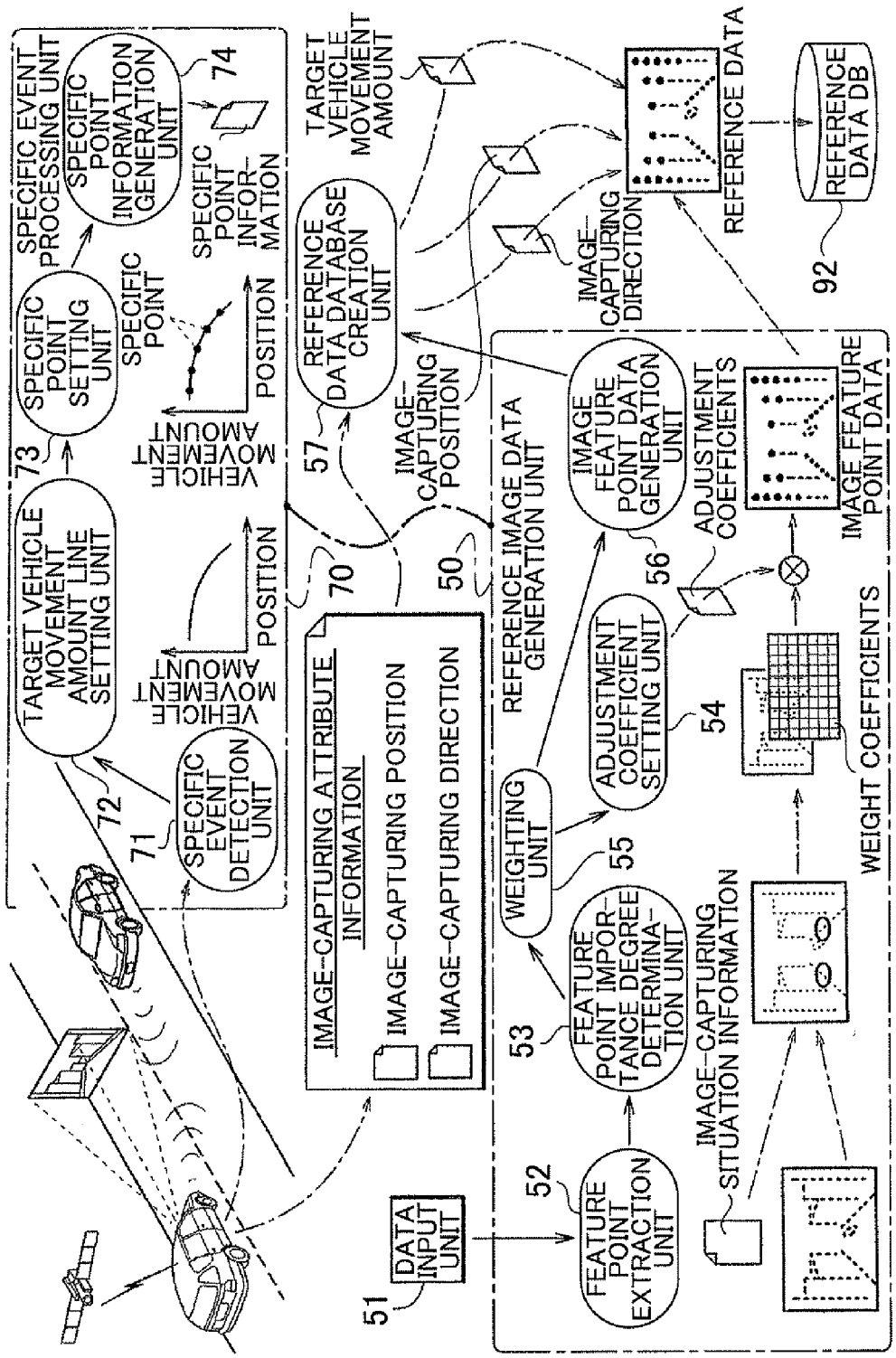
FIG. 2 is a functional block diagram showing main functions of the image processing system according to the embodiment of the invention.

Next, the image processing system according to the embodiment of the invention, which generates the reference data from the captured image based on the basic concept of the above-described position measurement technology, will be described. A functional block diagram in FIG. 2 schematically shows functions of the image processing system, which are particularly related to the embodiment of the invention. Functional units of the image processing system include a data input unit 51, a reference image data generation unit 50, a specific event processing unit 70, and a reference data database creation unit 57. The captured image, the image-capturing attribute information including the image-capturing position and the image-capturing direction, and the image-capturing situation information are input to the data input unit 51. The reference image data generation unit 50 generates the reference image data that is the image feature point data based on the captured image. The specific event processing unit 70 outputs specific point information including information on the above-described target vehicle movement amount and information on the specific position. The reference data database creation unit 57 generates the reference data to be stored in the reference data DB 92 by associating the reference image data with the specific position, the target vehicle movement amount, and the like, and creates the database of the reference data. Each of the functions may be implemented by hardware, software, or combination of hardware and software.

The specific event processing unit 70 includes a specific event detection unit 71, a target vehicle movement amount line setting unit 72, a specific point setting unit 73, and a specific point information generation unit 74. The specific event detection unit 71 determines whether the image-capturing position in a road region where the specific event occurs, based on road map information on the image-capturing position, and the target vehicle movement amount at the image-capturing position. When the specific event detection unit 71 detects that the captured image, whose image-capturing position in the road region where the specific event occurs, is input, processing regarding the specific event is started.

The target vehicle movement amount line setting unit 72 sets the target vehicle movement amount line that defines the relation between the vehicle position and the target vehicle movement amount in the specific event detected by the specific event detection unit 71. The target vehicle movement amount line is generally a function graph showing the relation between the vehicle position and the target vehicle movement amount. For example, when the vehicle position is represented by a variable P, the target vehicle movement amount is represented by a variable Q, and a function is represented by F, the relation between the vehicle position and the target vehicle movement amount is represented by Q=F (P). A table, in which the function is set for each type of the specific event, is prepared. The specific point setting unit 73 sets the specific point on the target vehicle movement amount line. The specific point is used as a guide for vehicle movement in the specific event. The specific point is determined by selecting the target vehicle movement amount or the specific position. Accordingly, the specific point setting unit 73 also functions as a target vehicle movement amount setting unit or a specific position setting unit. By setting the specific point, the combination of the target vehicle movement amount and the specific position, which define the specific point, is obtained. That is, when the target vehicle movement amount is represented by Qs, and the specific position is represented by Ps, the relation between the target vehicle movement amount and the specific position is represented by Qs=F (Ps). When one or a plurality of specific points are set, the specific point information generation unit 74 generates specific point information including information on the specific position and information on the target vehicle movement amount, which define each specific point. When the specific point information is provided to the reference image data generation unit 50, the image feature point data is generated from the captured image whose image-capturing position matches the specific position, and the generated image feature point data is provided to the reference data database creation unit 57 as the reference image data. Accordingly, the reference data on the road region related to the specific event, which is created by the reference data database creation unit 57, is associated with the target vehicle movement amount, in addition to the image-capturing position (the specific position) and the image-capturing direction.

Figure 3:
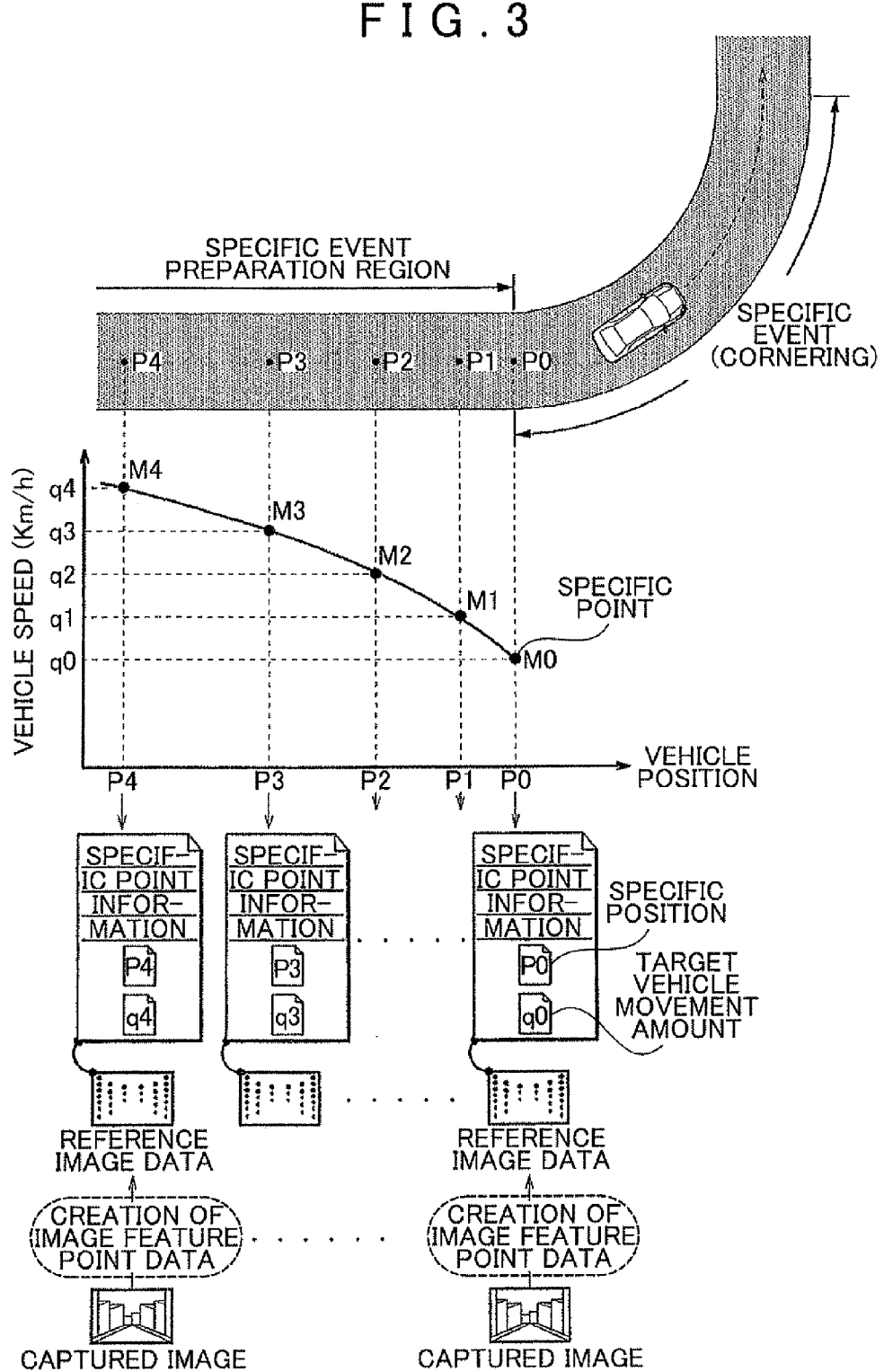
FIG. 3 is a schematic diagram showing a relation among the target vehicle movement amount, a specific position, and reference image data in a specific event in an example where a decelerating behavior occurs before cornering.

Hereinafter, functions performed by the target vehicle movement amount line setting unit 72, the specific point setting unit 73, and the specific point information generation unit 74 will be schematically described with reference to FIG. 3 and FIG. 4. FIG. 3 is a schematic diagram showing the relation among the target vehicle movement amount, the specific position, and the reference image data in the specific event in an example where a decelerating behavior occurs before cornering. The diagram regarding the specific event shows a deceleration region where the vehicle travels before cornering, and a curved road region where cornering occurs as the specific event. The deceleration region is a specific event preparation region. Each of the deceleration region and the curved road region is an example of the predetermined road section. A cornering starting point on a road, at which the vehicle starts cornering, is shown as a point P0. Further, points P1, P2, P3, and P4 are set behind the point P0 in a direction in which the vehicle moves. Each of the points P0 to P4 is an example of the specific position. The target vehicle movement amount line in the specific event is a deceleration line showing deceleration at 0.2 G. Accordingly, the target vehicle movement amount in the deceleration region is a vehicle speed (km/h). The target vehicle movement amount at a basic specific point M0 is q0 (=30 km/h). The vehicle speed q0 (=30 km/h) is the optimum vehicle speed at the position (the point P0) at which the vehicle starts cornering. Further, in addition to the specific point M0, specific points M1, M2, M3, and M4 are set. The target vehicle movement amount at each of the specific points M1, M2, M3, and M4 is different from the target vehicle movement at the specific point M0. For example, specific points M1, M2, M3, and M4, at which the vehicle speed is q1 (=40 km/h), q2 (=50 km/h), q3 (=60 km/h), and q4 (=70 km/h), respectively, are set. Then, specific positions P0, P1, P2, P3, and P4 are set based on the specific points M0, M1, M2, M3, and M4, respectively. Thus, the specific point information is generated. The specific point information is information on the specific points, each of which is defined by the information on the specific position and the information on the target vehicle movement amount.

On the basis of the specific point information, the reference image data to be stored in the reference data DB 92 is generated by associating the image feature point data, that is, the reference image data whose image-capturing position matches each specific position, with the specific position and the target vehicle movement amount. The reference data created in the above-described manner may be used as follows. For example, in the case where the reference data associated with the vehicle speed 60 km/h (q3) matches the actually-captured image (in actuality, the image feature point data based on the actually-captured image), when the vehicle is traveling at the vehicle speed of 60 km/h at the time point, the vehicle is required to start decelerating at the time point, when the actual vehicle speed is higher than 60 km/h, greater deceleration is required, and when the actual vehicle speed is lower than 60 km/h, deceleration is not required. Thus, the reference data on the road region related to the specific event is associated with the appropriate target vehicle movement amount. Therefore, it becomes possible to perform various appropriate controls regarding the target vehicle movement amount, at the time point at which the reference data matches the captured image.

Figure 4:
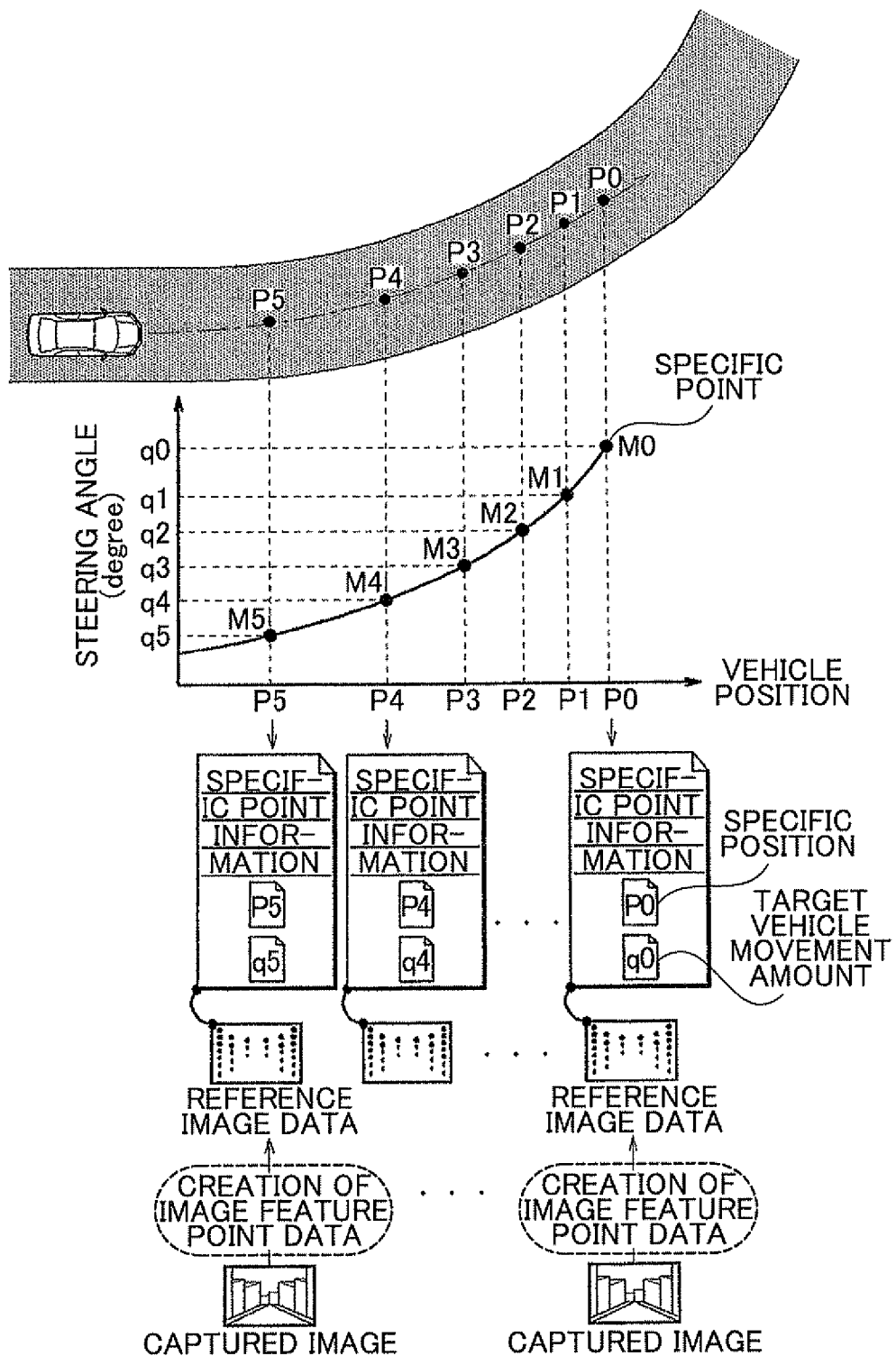
FIG. 4 is a schematic diagram showing a relation among the target vehicle movement amount, the specific position, and the reference image data in the specific event in an example in which a steering behavior occurs during cornering.

FIG. 4 shows another example. FIG. 4 is a schematic diagram showing the relation among the target vehicle movement amount, the specific position, and the reference image data in the specific event in an example in which a steering behavior occurs during cornering. The diagram regarding the specific event shows a clothoid curve region that is an example of the predetermined road section. In the clothoid curve region, a steering angle is required to be changed over time during the specific event. Steering points P5, P4, P3, P2, P1, and P0 on a road are set in the stated order in the direction in which the vehicle travels. In this case, the target vehicle movement amount is the steering angle. The target vehicle movement amount at a specific point M0, at which a final steering angle is achieved, is a steering angle q0. In addition to the specific point M0, specific points M1, M2, M3, M4, and M5 are set. The target vehicle movement amount at each of the specific points M1, M2, M3, M4, and M5 is different from the target vehicle movement amount at the specific point M0. For example, specific points M1, M2, M3, M4, and M5, at which the steering angle is q1, q2, q3, q4, and q5, respectively, are set. Then, specific positions P0, P1, P2, P3, P4, and P5 are set based on the specific points M0, M1, M2, M3, M4, and M5, respectively. Thus, the specific point information is generated. The specific point information includes the information on the specific position and the information on the target vehicle movement amount, which define each specific point. On the basis of the specific point information, the reference data to be stored in the reference data DB 92 is generated by associating the image feature point data, that is, the reference image data whose image-capturing position matches each specific position, with the specific position and the target vehicle movement amount. In the case where the reference data created in the above-described manner are used, for example, when the reference data associated with the steering angle q3 matches the actually-captured image (in actuality, the image feature point data based on the actually-captured image), and the steering angle of the vehicle at the time point deviates from the steering angle q3, a notification that the steering angle should be adjusted may be provided, or the steering angle may be adjusted.

The captured image obtained by capturing an image of a scene using the camera provided in a vehicle, the image-capturing attribute information including the image-capturing position and the image-capturing direction at the time of image capturing, and the image-capturing situation information are input to the data input unit 51. The vehicle may be a vehicle that is traveling for the purpose of creating the reference data. In an example in which the image processing system is provided in the vehicle, the captured image, the image-capturing attribute information, and the image-capturing situation information are input to the data input unit 51 in real time. However, in an example in which the image processing system is installed in a data processing center or the like, the captured image, the image-capturing attribute information, and the image-capturing situation information are temporarily stored in a storage medium, and these data are input to the data input unit 51 in a batch processing manner. Methods of generating the captured image and the image-capturing attribute information are known, and therefore, the description thereof is omitted.

The image-capturing situation information is information indicating the possibility that a specific subject is included in the captured image. Examples of the specific subject include objects that define a traveling lane in which the vehicle travels, such as a guide rail and a groove at a road shoulder, moving objects such as a nearby traveling vehicle, an oncoming vehicle, a bicycle, and a pedestrian, and scenic objects that are the features of a mountainous area, a suburban area, an urban area, a high-rise building area, and the like, such as a mountain and a building. In the embodiment, the contents of the image-capturing situation information include traveling lane data $D_L$, moving object data $D_O$, and area attribute data $D_A$. The traveling lane data $D_L$ is data that shows a region of the traveling lane, and a region outside a road, in the captured image. The traveling lane data $D_L$ is obtained based on the result of recognition of white lines, a guide rail, and a safety zone. The white lines, the guide rail, and the safety zone are recognized through the image processing performed on the captured image. The moving object data $D_O$ is data that shows a region where a moving object near the vehicle exists in the captured image. The moving object near the vehicle is recognized by a vehicle-mounted sensor that detects an obstacle, such as a radar. The area attribute data $D_A$ is data that shows the type of an image-capturing area in which the captured image is obtained by capturing the image, that is, an area attribute of the image-capturing area. Examples of the area attribute include a mountainous area, a suburban area, an urban area, and a high-rise building area. The type, that is, the area attribute of the image-capturing area is recognized based on the vehicle position when the captured image is obtained by capturing the image, and map data.

The reference image data generation unit 50 includes a feature point extraction unit 52, a feature point importance degree determination unit 53, a weighting unit 55, an adjustment coefficient setting unit 54, and an image feature point data generation unit 56. The feature point extraction unit 52 extracts the edge points from the captured image, as the image feature points, using an appropriate operator. The feature point importance degree determination unit 53 determines the importance degrees of the image feature points extracted by the feature point extraction unit 52, based on the contents of each data included in the image-capturing situation information. For example, when the contents of the traveling lane data $D_L$ are used, a high importance degree is assigned to the image feature point in a road shoulder-side region outside the traveling lane in the captured image, as compared to an importance degree assigned to the image feature point in a region inside the traveling lane in the captured image. When the moving object data $D_O$ is used, a low importance degree is assigned to the image feature point in a region where a moving object exists in the captured image, as compared to an importance degree assigned to the image feature point in a region where the moving object does not exist in the captured image. Further, when the contents of the area attribute data $D_A$ are used, a rule for assigning the importance degrees to the image feature points in accordance with the positions of the image feature points in the captured image is changed in accordance with the above-described area attribute. For example, in the captured image of a mountainous area, because there is a high possibility that there is sky above a central optical axis for image capturing, and there are woods on the right and left sides of the central optical axis for image capturing, a high importance degree is assigned to the image feature point in a center region around the central optical axis for image capturing, as compared to an importance degree assigned to the image feature point in a region other than the central region. In the captured image of a suburban area, because there is not much traffic, and there are structural objects such as houses around, a high importance degree is assigned to the image feature point in a region below the central optical axis for image capturing, as compared to an importance degree assigned to the image feature point in a region above the central optical axis for image capturing. In the captured image of an urban area, because there is much traffic, a high importance degree is assigned to the image feature point in a region above the central optical axis for image capturing, as compared to a region below the central optical axis for image capturing. In the captured image of a high-rise building area, because there are many elevated roads and elevated bridges, a high importance degree is assigned to the image feature point in a region above the central optical axis for image capturing, as compared to a region below the central optical axis for image capturing.

The weighting unit 55 assigns weight coefficients to the image feature points in accordance with the importance degrees assigned by the feature point importance degree determination unit 53. Because a high importance degree is assigned to the image feature point that is considered to be important for performing accurate image recognition (accurate pattern matching), a high weight coefficient is assigned to the image feature point to which a high importance degree has been assigned. On the other hand, taking into account that there is a high possibility that the image feature point, to which a low importance degree has been assigned, is not used for the actual image recognition, or is deleted from the reference data, a low weight coefficient is assigned to the image feature point to which a low importance degree has been assigned so that the low weight coefficient is used for determining whether to select or delete the image feature point.

The adjustment coefficient setting unit 54 calculates adjustment coefficients used for changing the weight coefficients assigned by the weighting unit 55, in view of the distribution state of the weight coefficients in the captured image. The importance degrees, which have been assigned to the image feature points extracted by the feature point extraction unit 52 based on the image-capturing situation information, include certain errors. As a result, there is considered to be a possibility that the image feature points, to which high importance degrees have been assigned, are randomly distributed. Therefore, when the image feature points to which high importance degrees have been assigned are unevenly distributed, in other words, when the image feature points to which high weight coefficients have been assigned by the weighting unit 55 are unevenly distributed, the adjustment coefficient setting unit 54 is used to make the distribution less uneven. When the dispersion of the image feature points obtained through the computation processing indicates that the image feature points to which the high weight coefficients have been assigned are unevenly distributed, the adjustment coefficient is set to increase the weight coefficient(s) of the image feature points in a region where the density of the image feature points to which the high weight coefficients have been assigned is low, and the adjustment coefficient is set to decrease the weight coefficient(s) of the image feature points in a region where the density of the image feature points to which the high weight coefficients have been assigned is high.

The image feature point data generation unit 56 generates the image feature point data for each captured imaged, by performing processing on the image feature points based on the weight coefficients assigned by the weighting unit 55, or based on the weight coefficients and the assigned adjustment coefficients in some cases. When generating the image feature point data, the number of the image feature points may be reduced to efficiently perform the matching processing, by deleting the image feature points with the weighting coefficients equal to or lower than a threshold value. Also, the image feature point data may be provided with the weight coefficients so that the weight coefficients are associated with the image feature points in the reference data as well, and the weight coefficients are used for calculating weighted similarity when the pattern matching processing is performed.

The processing of distributing the image feature points in the image feature point data over an entire region of the captured image as widely as possible using the above-described adjustment coefficients will be described with reference to a schematic explanatory diagram shown in FIGS. 5A to 5F. A feature point image (FIG. 5B) is generated by extracting the image feature points from the captured image (FIG. 5A). The importance degree is assigned to each image feature point in the feature point image. FIG. 5C shows the importance degrees corresponding to the image feature points in the form of an importance degree layer corresponding to the feature point image, in order to make it possible to schematically understand how the importance degrees are assigned. The weighting coefficient is assigned to each image feature point using the importance degree layer. FIG. 5D shows the image feature points to which the weight coefficients have been assigned, in the form of the feature point image in which the size of the image feature point increases as the weight coefficient of the image feature point increases. If processing is performed on the image feature points, for example, to delete the image feature points to which the weight coefficients equal to or lower than the threshold value have been assigned, that is, for example, if the image feature points other than the large-sized image feature points in FIG. 5D are deleted, the image feature points located in a lower region in the feature point image are removed. As a result, the remaining image feature points (that is, the image feature points in the image feature point data) may be extremely unevenly distributed. In order to avoid the uneven distribution of the image feature points, the degree of distribution of the image feature points in the feature point image is calculated, and the adjustment coefficients are set to increase the weight coefficient(s) of the image feature points in a region where the density of the remaining image feature points is low as a result of performing processing on the image feature points. In order to make it possible to schematically understand the adjustment coefficients that are set in the above-described manner, FIG. 5E shows groups of the adjustment coefficients in the form of an adjustment coefficient layer corresponding to the feature point image. In the adjustment coefficient layer, the adjustment coefficients are arranged in a matrix manner (i.e., the adjustment coefficient is assigned to each section composed of a plurality of pixel regions). The image feature point data generation unit 56 performs processing on the image feature points using the weight coefficients and the weight coefficients that are finally set based on the adjustment coefficients, thereby generating the image feature point data shown in FIG. 5F for each captured image.

The example, in which the importance degree of each image feature point is determined, and as a result, the weight coefficient of each image feature point is set, has been described above. However, the processing may be performed for each image feature point group. In this case, for example, the region of the captured image may be divided into a plurality of image sections, and the feature point importance degree determination unit 53 may divide the image feature points into image feature point groups so that each image feature point group includes the image feature points in the same image section, and may perform the processing for each image feature point group. In this case, the feature point importance degree determination unit 53 may assign the same importance degree to the image feature points included in the same image feature point group. Similarly, the weighting unit 55 may set the weight coefficient for each image feature point group. In this case, the image sections may be set in a manner such that each image section is composed of one pixel included in the captured image, or each image section is composed of a plurality of pixels.

Figure 6:
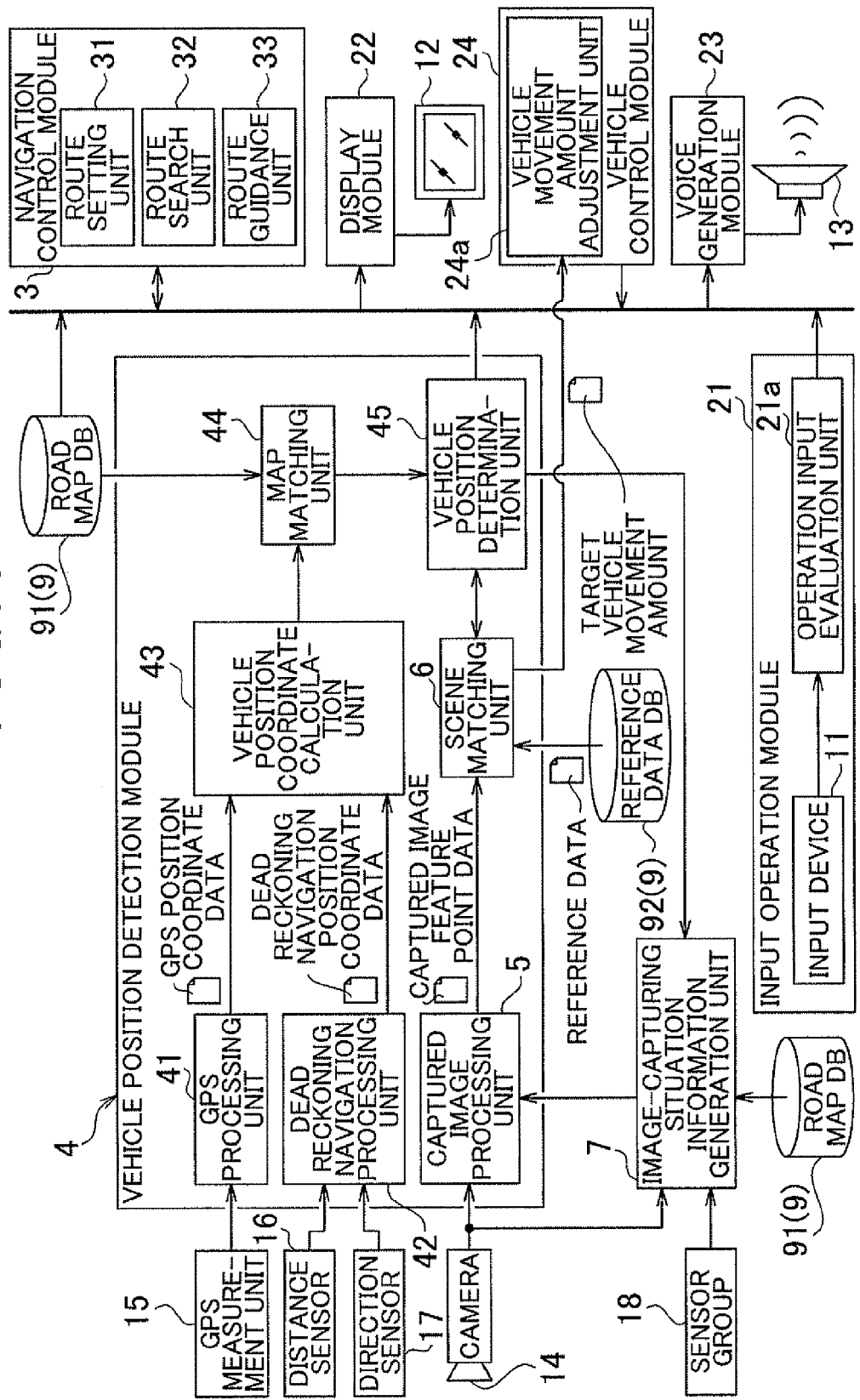
FIG. 6 shows functional blocks of a car navigation system that uses a reference data database created by the image processing system according to the embodiment of the invention.

Next, a vehicle-mounted car navigation system, which corrects the vehicle position by performing the scenic image recognition (the image feature point pattern matching) using the reference data DB 92 created by the above-described image processing system, and outputs information regarding a vehicle control, will be described. FIG. 6 shows functional blocks in an example in which the car navigation system is installed in a vehicle-mounted LAN. The car navigation system includes an input operation module 21, a navigation control module 3, a vehicle position detection module 4, an image-capturing situation information generation unit 7, and a database 9 including the above-described reference data DB 92 and a road map database (hereinafter, simply referred to as "road map DB") 91 in which road map data for car navigation is stored.

The navigation control module 3 includes a route setting unit 31, a route search unit 32, and a route guidance unit 33. For example, the route setting unit 31 sets a departure point such as the current vehicle position, a destination that has been input, and pass-through points, and a traveling condition (for example, a condition as to whether an expressway is to be used). The route search unit 32 is a processing unit that performs computation processing for searching for a guidance route from the departure point to the destination based on the condition set by the route setting unit 31. The route guidance unit 33 is a processing unit that performs computation processing for providing appropriate route guidance to a driver in accordance with the route from the departure point to the destination, which is retrieved by the route search unit 32 as a result of searching. The route guidance unit 33 provides the route guidance, using guidance displayed on the screen of a monitor 12, voice guidance output from a speaker 13, and the like.

The vehicle position detection module 4 has a function of correcting the estimated vehicle position obtained by performing conventional position calculation using the GPS and performing conventional position calculation using dead reckoning navigation. The vehicle position detection module 4 corrects the estimated vehicle position based on the vehicle position determined by the scenic image recognition using the estimated vehicle position. The vehicle position detection module 4 includes a GPS processing unit 41, a dead reckoning navigation processing unit 42, a vehicle position coordinate calculation unit 43, a map matching unit 44, a vehicle position determination unit 45, a captured image processing unit 5, and a scene matching unit 6. The GPS processing unit 41 is connected to a UPS measurement unit 15 that receives GPS signals from GPS satellites. The GPS processing unit 41 analyzes the signals from the GPS satellites received by the GPS measurement unit 15, calculates the current position of the vehicle (i.e., the latitude and the longitude), and transmits the current position of the vehicle to the vehicle position coordinate calculation unit 43 as GPS position coordinate data. The dead reckoning navigation processing unit 42 is connected to a distance sensor 16 and a direction sensor 17. The distance sensor 16 is a sensor that detects the speed and the moving distance of the vehicle. For example, the distance sensor 16 includes a vehicle speed pulse sensor that outputs a pulse signal each time the drive shaft, the wheel, or the like of the vehicle rotates by a certain amount, a yaw rate/acceleration sensor that detects the acceleration of the vehicle, and a circuit that integrates the detected values of the acceleration. The distance sensor 16 outputs information on the speed of the vehicle and information on the moving distance of the vehicle, which are the results of detection, to the dead reckoning navigation processing unit 42. For example, the direction sensor 17 includes a gyro sensor, a geomagnetic sensor, an optical rotation sensor and a rotary variable resistor that are attached to the rotational unit of a steering wheel, and an angle sensor attached to a wheel unit. The direction sensor 17 outputs information on the direction, which is the result of detection, to the dead reckoning navigation processing unit 42. The dead reckoning navigation processing unit 42 computes dead reckoning navigation position coordinates based on the moving distance information and the direction information, which are transmitted to the dead reckoning navigation processing unit 42 at every moment, and transmits the computed dead reckoning navigation position coordinates to the vehicle position coordinate calculation unit 43 as the dead reckoning navigation position coordinate data. The vehicle position coordinate calculation unit 43 performs computation processing to determine the coordinates of the vehicle position based on the GPS position coordinate data and the dead reckoning navigation position coordinate data, using a known method. The calculated vehicle position information includes a measurement error and the like. Therefore, the calculated vehicle position may deviate from a road in some cases. Thus, the map matching unit 44 adjusts the vehicle position information so that the vehicle is positioned on a road shown in the road map. The coordinates of the vehicle position are transmitted to the vehicle position determination unit 45 as the estimated vehicle position.

The captured image processing unit 5 substantially includes most of functional units that constitute the reference image data generation unit 50 of the image processing system shown in FIG. 2. The captured image processing unit 5 includes the data input unit 51, the feature point extraction unit 52, the feature point importance degree determination unit 53, the weighting unit 55, the adjustment coefficient setting unit 54, and the image feature point data generation unit 56. When the captured image of a scene ahead of the vehicle, which is the image captured by the vehicle-mounted camera 14, is input to the data input unit 51, the image feature point data is output from the image feature point data generation unit 56 through the above-described steps. The image-capturing situation information used by the feature point importance degree determination unit 53 is generated by the image-capturing situation information generation unit 7 provided in the vehicle, and transmitted to the captured image processing unit 5. The image-capturing situation information generation unit 7 is connected to the vehicle-mounted camera 14 in order to generate the above-described traveling lane data $D_L$, and the image-capturing situation information generation unit 7 receives the captured image that is the same as the captured image transmitted to the captured image processing unit 5. The traveling lane data $D_L$ is created by performing image processing on the received captured image, using a known algorithm. The image-capturing situation information generation unit 7 is connected to a sensor group 18 for detecting an obstacle, in order to create the above-described moving object data $D_O$. The image-capturing situation information generation unit 7 creates the moving object data $D_O$ based on sensor information transmitted from the sensor group 18. Further, the image-capturing situation information generation unit 7 is connected to the vehicle position determination unit 45 and the database 9, in order to create the above-described area attribute data $D_A$. The image-capturing situation information generation unit 7 obtains the area attribute of an area where the vehicle is currently traveling, by searching the database 9 using the coordinates of the vehicle position transmitted from the vehicle position determination unit 45 as a search condition. Examples of the area attribute include a mountainous area and an urban area. The image-capturing situation information generation unit 7 creates the area attribute data $D_A$ based on the obtained area attribute.

The scene matching unit 6 performs the pattern matching processing on the data for matching that is the image feature point data transmitted from the captured image processing unit 5, using, as the matching pattern, the reference data extracted from the reference data DB 92 based on the estimated vehicle position transmitted from the vehicle position determination unit 45. When the reference data matches the data for matching, the image-capturing position associated with the matching reference data is retrieved. The retrieved image-capturing position is transmitted to the vehicle position determination unit 45, as the vehicle position. The vehicle position determination unit 45 corrects the vehicle position, that is, replaces the estimated vehicle position with the transmitted vehicle position.

Figure 7:
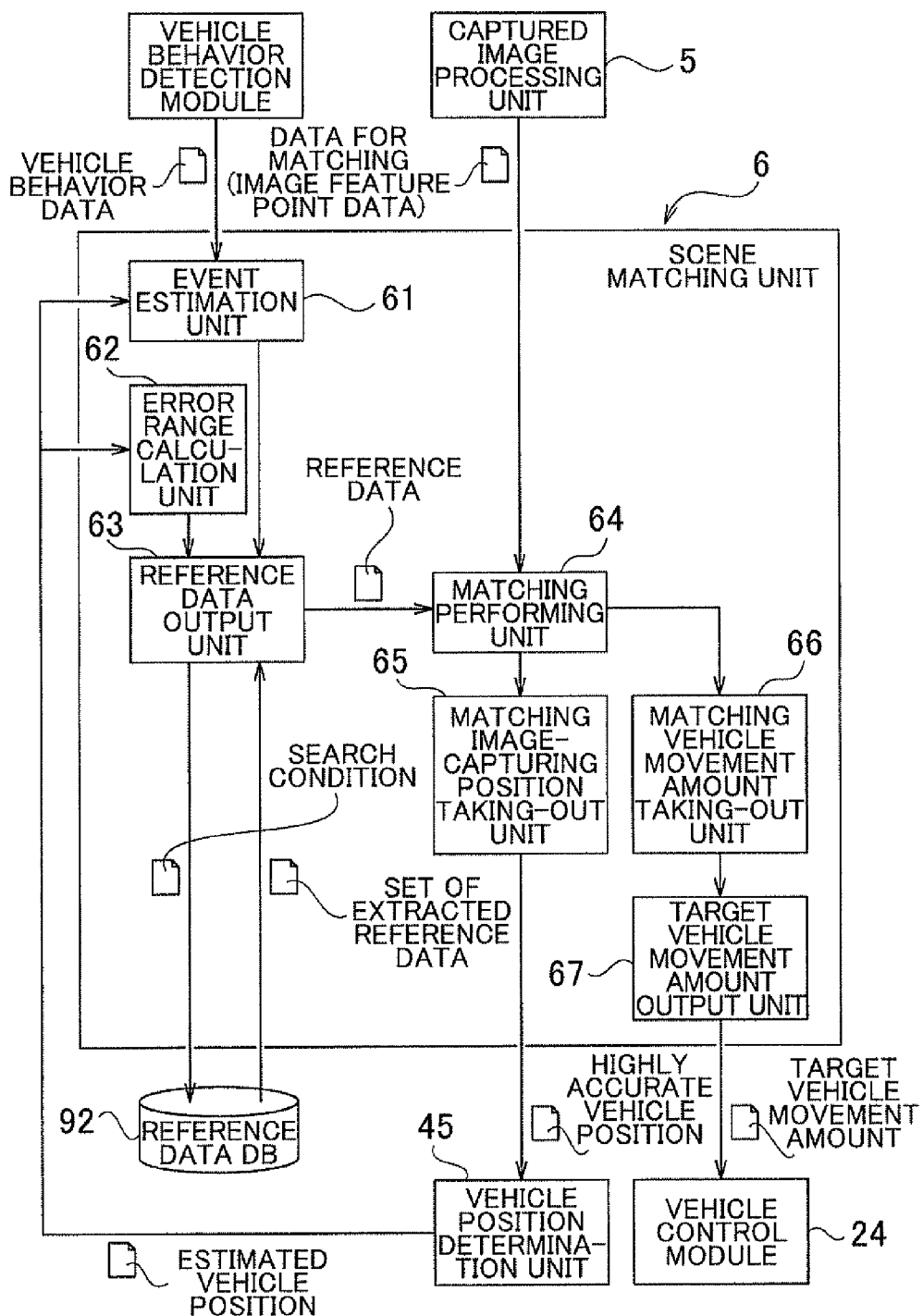
FIG. 7 is a functional block diagram showing functions of a scene matching unit according to the embodiment of the invention.

FIG. 7 is a functional block diagram used for explaining functional units included in the scene matching unit 6 that performs the scenic image recognition, using the reference data extracted using the error range, and the data for matching generated from the captured image. The scene matching unit 6 includes an event estimation unit 61, an error range calculation unit 62, a reference data output unit 63, a matching performing unit 64, a matching image-capturing position taking-out unit 65, a matching vehicle movement amount taking-out unit 66, and a target vehicle movement amount output unit 67.

The event estimation unit 61 estimates whether the above-described specific event may occur, based on the estimated vehicle position. The event estimation unit 61 includes a table in which positions on a road map are associated with specific events. When the specific event occurs, there is a high possibility that the reference data that matches the data for matching is associated with the target vehicle movement amount. Therefore, when the event estimation unit 61 estimates that the specific event may occur, the event estimation unit 61 provides an instruction to check whether the reference data that matches the data for matching is associated with the target vehicle movement amount.

The reference data output unit 63 extracts a set of the reference data associated with the specific positions, from the reference data DB 92, based on the estimated vehicle position. In the embodiment, the error range calculation unit 62 calculates the error range based on the estimated vehicle position, taking into account the error in the estimated vehicle position. The reference data output unit 63 determines the specific positions that exist in the error range of the estimated vehicle position, and extracts a set of the reference data corresponding to the specific positions that exist in the error range of the estimated vehicle position, from the reference data DB 92. When the event estimation unit 61 estimates that the vehicle may travel in the predetermined road section such as a curved road, that is, the specific event may occur, a set of the reference data associated with the specific positions are extracted. However, the event estimation unit 61 may have a function of creating a search condition for extracting the reference data, separately from the error range calculated by the error range calculation unit 62. For example, only when it is estimated that the vehicle may travel in the predetermined road section, a set of the reference data whose specific positions are in the estimated error range may be extracted from the reference data DB 92. The reference data output unit 63 transmits the reference data taken out from the reference data DB 92 using the search condition, to the matching performing unit 64. The matching performing unit 64 performs the pattern matching on the data for matching, while sequentially setting each reference data in the extracted reference dataset as the pattern. When the reference data matches the data for matching, the matching image-capturing position taking-out unit 65 retrieves the image-capturing position (the specific position) associated with the reference data that matches the data for matching, and transmits the retrieved image-capturing position to the vehicle position determination unit 45 as the highly accurate vehicle position. The matching vehicle movement amount taking-out unit (retrieval unit) 66 retrieves the target vehicle movement amount associated with the reference data that matches the data for matching. The target vehicle movement amount output unit 67 converts the format of the data on the target vehicle movement amount that has been retrieved by the matching vehicle movement amount taking-out unit 66 and transmitted to the target vehicle movement amount output unit 67, to an internally processable format, and outputs the target vehicle movement amount to the vehicle control module 24 connected to the target vehicle movement amount output unit 67 through the vehicle-mounted LAN.

The car navigation system further includes, as peripheral devices, an input operation module 21, a display module 22, and a voice generation module 23. The input operation module 21 includes an input device 11 including a touch panel and a switch; and an operation input evaluation unit 21a that transforms an operation input through the input device 11 to an appropriate operation signal, and transmits the operation signal to the car navigation system. The display module 22 causes the monitor 12 to display image information necessary for car navigation. The voice generation module 23 causes the speaker 13 and a buzzer to output voice information necessary for car navigation.

The target vehicle movement amount output from the target vehicle movement amount output unit 67 of the car navigation system indicates the appropriate target vehicle movement amount at the current position of the vehicle, for example, the appropriate vehicle speed, the appropriate steering angle, or the like. In order to use the useful target vehicle movement amount, the vehicle control module 24, which is connected with the car navigation system through the vehicle-mounted LAN to transmit and receive data to and from the car navigation system, includes a vehicle movement amount adjustment unit 24a that adjusts the movement amount of the vehicle based on the received target vehicle movement amount.

In one of preferred embodiments of the invention, the target vehicle movement amount may be the vehicle speed at the specific position, which is set for passing through the predetermined road section. With this configuration, when the reference data matches the captured image obtained by capturing an image viewed from the vehicle, the vehicle speed, which is the important movement characteristic of the vehicle, is recognized as the target value or the optimum value at the specific position. For example, when the predetermined road section is a curved road, the vehicle needs to decelerate before a starting point of the curved road. When the vehicle speed is the target vehicle movement amount, the reference data is generated by associating the reference image data based on the captured image at the specific position, with the specific position and the vehicle speed. Accordingly, when matching is sequentially repeated between the reference data and the captured image that is obtained while the vehicle is actually traveling, and the reference data matches the captured image, it is possible to recognize the appropriate vehicle speed at the specific position, based on the specific position and the vehicle speed associated with the reference data that matches the captured image.

In one of preferred embodiments of the invention, the predetermined road section may include a curved road, and the target vehicle movement amount may be a steering angle at the specific position, which is set for passing through the predetermined road section. With this configuration, when the reference data matches the captured image obtained by capturing an image viewed from the vehicle, the steering angle, which is the important movement characteristic of the vehicle, is recognized as the target value or the optimum value at the specific position. For example, when the predetermined road section is a curved road, it is usually necessary to adjust the steering angle in accordance with a clothoid curve for a certain distance from a starting point of the curved road. When the steering angle is the target vehicle movement amount, the reference data is generated by associating the reference image data based on the captured image at the specific position, with the specific position and the steering angle. Accordingly, when matching is sequentially repeated between the reference data and the captured image that is obtained while the vehicle is actually traveling, and the reference data matches the captured image, it is possible to recognize the appropriate steering angle at the specific position, based on the specific position and the steering angle associated with the reference data that matches the captured image.

In one of preferred embodiments of the invention, the image processing system may further include a feature point extraction unit that extracts image feature points from the captured image; and an image feature point data generation unit that generates image feature point data of the captured image, using the image feature points; and the reference image data may be the image feature point data. With this configuration, the reference image data is the image feature point data that includes the image feature points. Therefore, the matching processing is easily and efficiently performed. In addition, the data volume of the reference image data is greatly reduced as compared to the data volume of the captured image. It is preferable that the image feature point should be a point in the image, which is stably detected. Therefore, the edge point detected using an edge detection filter or the like is generally used. Edge points that constitute linear edges showing the outline of a building, the outline of the window of a building, and the outlines of various billboards, that is, straight line component edge points are appropriate image feature points used in the embodiment of the invention, taking into account that the feature points are in the scenic image. Also, it is possible to reduce a computation load in the image recognition while maintaining the reliability of the image recognition, by using corner points, that is, intersection edge points that are the most important feature points in a building, a bridge, a billboard, and the like, among the straight line component edge points. The intersection edge point is the intersection of two straight line components. The corner points are detected relatively easily using, for example, the Harris operator.

In the above-described embodiment, among the edge points obtained as the image feature points through the edge detection processing, particularly, the line segment edge points (the straight line component edge points) that constitute one line segment, and the corner edge point (the intersection edge point) are treated as the useful image feature points. The corner edge point (the intersection edge point) corresponds to the intersection at which the line segments intersect with each other, preferably, the line segments are substantially orthogonal to each other. However, the image feature points used in the invention are not limited to such edge points. The image feature points useful for a scene may be used. For example, the typical edge points that form a geometric shape, such as a circle and a rectangle, may be used (when the geometric shape is a circle, the typical edge points may be three points on the circumference of the circle), or the gravity center of a geometric shape or a point indicating the gravity center of the geometric shape in the image may be used. Also, it is preferable to employ an edge intensity as a factor used for calculating the importance degree. For example, when a line segment is composed of an edge with a high intensity, the starting point and the ending point of the line segment may be treated as the image feature points to which a high importance degree is assigned, as compared to an importance degree assigned to the edge points other than the starting point and the ending point. Also, specific points in a characteristic geometric shape, for example, end points in a symmetrical object may be treated as the image feature points to which a high importance degree is assigned, as compared to an importance degree assigned to the edge points other than the end points.

Further, in addition to the edge points obtained through the edge detection processing, a point at which a hue and/or a chroma greatly change(s) in the captured image may be employed as the image feature point. Similarly, as the image feature point based on color information, the end point of an object with a high color temperature may be treated as the image feature point with a high importance degree.

That is, any image feature points may be used in the embodiment of the invention, as long as the image feature points are useful for the determination as to the degree of similarity between the reference data and the image feature point data generated based on the actually-captured image, for example, the pattern matching.

In the above-described embodiment, the reference data stored in the reference data DB 92 is associated with the image-capturing position and the image-capturing direction (the direction of the optical axis of the camera). The reference data may be associated with the above-described image-capturing situation information, a date on which the image is captured, a weather at the time of image capturing, and the like, in addition to the image-capturing position and the image-capturing direction.

The image-capturing position needs to be indicated by at least two-dimensional data such as data including the latitude and the longitude. The image-capturing position may be indicated by three-dimensional data including the latitude, the longitude, and the altitude.

The image-capturing direction does not necessarily need to be associated with the reference data. For example, in the case where it is ensured that when the reference data is created, the image is captured in a direction with respect to a road on which the vehicle is traveling, which is substantially the same as a direction in which the image is captured when the scenic image recognition is performed using the reference data, the image-capturing direction does not need to be associated with the reference data.

In the case where the image-capturing direction is associated with the reference data, and a plurality of reference data may be prepared by appropriately changing the image-capturing direction from one basic image-capturing direction, the direction in which the vehicle is traveling may be calculated based on information transmitted from the direction sensor and the like, and only the reference data, whose image-capturing direction coincides with the direction in which the vehicle is traveling, may be used for the scenic image recognition. Thus, when the image-capturing attribute information includes the image-capturing direction as described above, it is possible to reduce the amount of the reference data used for the matching, by specifying the image-capturing direction.

The most appropriate vehicle-mounted camera used in the embodiment of the invention is a camera that captures an image of a scene ahead of the vehicle in the direction in which the vehicle is traveling. However, the vehicle-mounted camera may be a camera that captures an image of a scene at a position obliquely ahead of the vehicle, or a camera that captures an image of a scene on the side of the vehicle, or an image of a scene behind the vehicle. That is, the captured image used in the invention is not limited to an image of a scene ahead of the vehicle in the direction in which the vehicle is traveling.

In the functional block diagram used to describe the above embodiment, the functional units are separated from each other so that the description is easily understandable. However, the invention is not limited to the case where the functional units are separated from each other as shown in the functional block diagram. At least two of the functional units may be freely combined with each other, and/or one functional unit may be further divided.

The technology according to the invention may be applied not only to car navigation, but also to a technical field in which the current position and the current direction are measured through the scenic image recognition, and to a technical field in which the vehicle is controlled based on the vehicle position.

What is claimed is:

1. An image processing system comprising:
   a data input unit to which a captured image obtained by capturing an image of a scene viewed from a vehicle in a predetermined road section, and an image-capturing position at which the image is captured to obtain the captured image are input;
   a target movement amount setting unit that uses a given position in the predetermined road section as a specific position, and sets a target vehicle movement amount of the vehicle at the specific position, for passing through the predetermined road section;
   a reference image data generation unit that generates reference image data from the captured image obtained at the specific position; and
   a reference data database creation unit that generates reference data that is used when scenic image recognition is performed by associating the reference image data with the specific position and the target vehicle movement amount at the specific position and generates a reference data database that is a database of the reference data.

2. The image processing system according to claim 1, wherein
   the target vehicle movement amount is a vehicle speed at the specific position, which is set for passing through the predetermined road section.

3. The image processing system according to claim 1, wherein
   the predetermined road section includes a curved road; and
   the target vehicle movement amount is a steering angle at the specific position, which is set for passing through the predetermined road section.

4. The image processing system according to claim 1, further comprising:
   a feature point extraction unit that extracts image feature points from the captured image; and
   an image feature point data generation unit that generates image feature point data of the captured image, using the image feature points,
   wherein
   the reference image data is the image feature point data.

5. A vehicle control system comprising:
   the reference data database created by the image processing system according to claim 1;
   a captured image processing unit to which a captured image is input, and which outputs data for matching based on the captured image, wherein the captured image is obtained by capturing an image of a scene viewed from a camera provided in a vehicle;
   a vehicle position estimation unit that estimates a position of the vehicle;
   a reference data extraction unit that extracts reference data from the reference data database, based on the estimated position of the vehicle;
   a matching performing unit that performs matching between the extracted reference data and the data for matching;
   a target vehicle movement amount retrieval unit that retrieves a target vehicle movement amount associated with the reference data that matches the data for matching; and
   a vehicle movement amount adjustment unit that adjusts a movement amount of the vehicle based on the retrieved target vehicle movement amount.

* * * * *